United States Patent

Sumi et al.

[11] 3,900,777
[45] Aug. 19, 1975

[54] FEED CONTROL APPARATUS FOR A GRINDING MACHINE

[75] Inventors: Hirotaka Sumi, Nagoya; Isao Suzuki, Okazaki; Isamu Yokoe, Obu; Tetsuo Matsuzaki, Nishio, all of Japan

[73] Assignee: Toyoda Koki Kabushiki Kaisha, Japan

[22] Filed: Oct. 26, 1973

[21] Appl. No.: 410,283

[30] Foreign Application Priority Data
Oct. 28, 1972 Japan............... 47-108219

[52] U.S. Cl. ........... 318/39; 318/603; 318/685; 318/696
[51] Int. Cl. ......................... G05b 19/24
[58] Field of Search ......... 318/39, 594, 603, 685, 318/696

[56] References Cited
UNITED STATES PATENTS

| | | | |
|---|---|---|---|
| 3,665,279 | 5/1972 | McIntosh | 318/603 |
| 3,746,956 | 7/1973 | Takegawa | 318/39 |
| 3,766,462 | 10/1973 | Kubo | 318/685 |
| 3,793,575 | 2/1974 | Sieradzki | 318/39 |
| 3,805,138 | 4/1974 | Hilker | 318/603 |

*Primary Examiner*—B. Dobeck
*Attorney, Agent, or Firm*—Oblon, Fisher, Spivak, McClelland & Maier

[57] ABSTRACT

A motor for moving a tool supporting member such as, for example, a wheel slide in a grinding machine, is digitally controlled in accordance with preset information on a control panel. After a fine grinding operation has been completed, the wheel slide is advanced at a creeping feed speed which is lower than the fine grinding speed so that the required size of a workpiece will be obtained during the course of the creeping feed. The feeding speed of the wheel slide is temporarily reduced to the creeping feed speed in the course of a rough grinding operation in order to improve the geometrical shape of the workpiece and to shorten the grinding cycle time.

13 Claims, 8 Drawing Figures

FEED CONTROL APPARATUS FOR A GRINDING MACHINE

BACKGROUND OF THE INVENTION

1. Field of the Invention

The present invention relates to apparatus for controlling a grinding machine and more particularly, to feed control apparatus for controlling a digitally controlled motor for a machine member.

2. Description of the Prior Art

Generally, it is required during a grinding operation that the feed speed of the machine member, which may be a wheel slide for a grinding wheel, be precisely controlled and furthermore, be able to be changed in a stable manner several times in one grinding cycle.

From the viewpoint of operational efficiency, reduction in grinding cycle time is quite important. Therefore, the air cutting operation should preferably be eliminated or reduced to as short a time as possible. Also, the wheel slide should approach and retract from the workpiece at a much faster speed than the grinding feed speed.

The machining accuracy required on a workpiece is, of course, very high and thus, any errors due to various factors such as, for example, thermal deformation of the machine elements, bending of the workpiece, or wearing of the grinding wheel cannot be permitted. Therefore, it is required that the feeding speed be easily variable in a wide range by an operator in order to be adaptable to various grinding conditions and workpieces. It is also better practice to move the wheel slide at a rapid speed when it approaches and retracts from the workpiece, but the digital motor cannot increase its rotational speed indefinitely, since when the high frequency drive pulse signals are applied thereto, the digital motor is prone to misoperation which thereby results in a decrease in the machining accuracy.

Furthermore, the workpiece diameter should be measured in order to detect the remaining stock of the workpiece, and the feed speed should be appropriately changed in accordance with the detected remaining stock so that various factors, such as the elimination of hardened portions due to the grinding operation, the geometrical shape, and the finished size of the workpiece, will be satisfactory. It should be noted that geometrical deformation of the workpiece and/or hardened portions thereon due to the grinding operation should be removed to a certain extent before the fine grinding operation in order to obtain a good roundness of the workpiece.

Conventionally, the feed of the grinding wheel is temporarily stopped after the rough grinding operation in order to eliminate the above-mentioned drawbacks and is also stopped at the final operation to perform the spark-out operation. Presently, heavy grinding operations are performed to obtain high operational efficiency and therefore, thermal and mechanical deformations are considerably large. When the spark-out operation is performed after the round grinding operation, the workpiece is disengaged from the grinding wheel by the shrinkage thereof since the spark-out operation must be performed for an extended period in order to cook the workpiece whose temperature is highly elevated during the heavy grinding operation.

Accordingly, when the grinding operation is once started again, the grinding is not immediately performed to thereby increase the grinding cycle time.

Furthermore, even if the spark-out operation is performed at the final stage, the required diameter of the workpiece may not yet be obtained and thus, the grinding operation must again be started and terminated when the required diamter is obtained. Accordingly, the accuracy of the workpiece fluctuates depending upon the operational stage at which the required diameter is obtained.

SUMMARY OF THE INVENTION

It is, therefore, an object of the present invention to provide feed control apparatus which satisfies the above mentioned requirements such as the finished size and the roundness of the workpiece in a grinding operation.

The foregoing and other objects are attained in accordance with one aspect of the present invention through the provision of feed control apparatus for a grinding machine which comprises variable frequency pulse generating means for generating a series of pulse signals, caliper means for measuring the workpiece and for generating a plurality of caliper signals when the workpiece is ground to predetermined sizes, a stepping motor for causing relative motion between supports in response to the pulse signals, counter means for counting the number of pulse signals supplied to the stepping motor to detect the distance between the supports, first presetting means for digitally presetting feeding amounts through which the supports are relatively moved from each other, second presetting means for digitally presetting feeding speeds of the stepping motor at various operational stages, comparing means for comparing the contents in the counter means and the first presetting means and for generating match signals when the contents match each other, and control means for selecting one of the second presetting means to supply a preset digital value to the variable frequency pulse generator in response to the match signals and the caliper signals in order to perform the relative motion between the supports at the feeding speed as directed by the digital value.

BRIEF DESCRIPTION OF THE DRAWINGS

Various objects, features and attendant advantages of the present invention will be more fully appreciated as the same becomes better understood by reference to the following detailed description of the present invention when considered in connection with the accompanying drawings, in which.

DETAILED DESCRIPTION OF A PREFERRED EMBODIMENT

Figure 1:
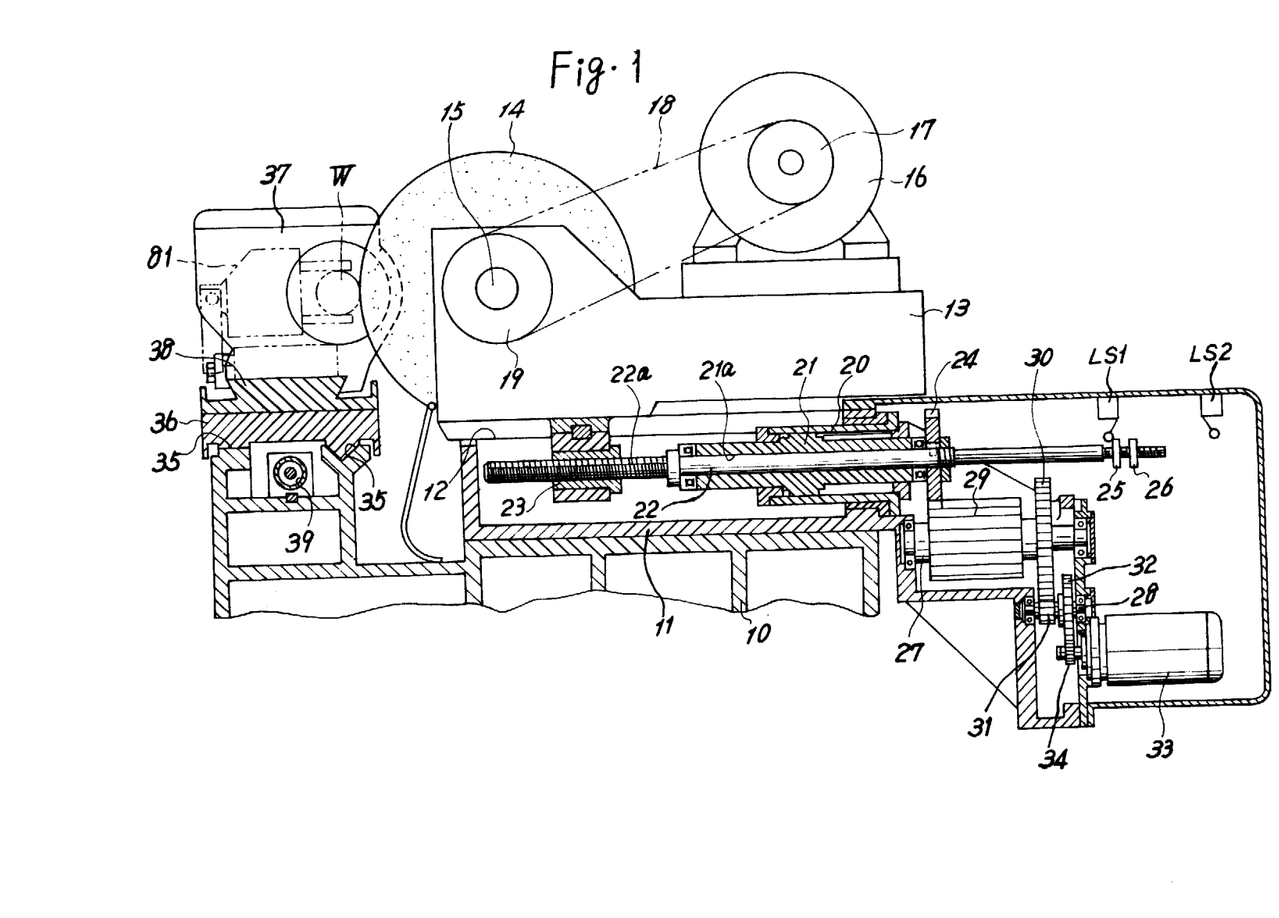
FIG. 1 is a sectional view showing the main portion of a wheel slide feed mechanism.

Referring now to the drawings, wherein like reference numerals designate identical or corresponding parts throughout the several views, and more particularly to FIG. 1 thereof, a support base 11 is fixedly mounted on a bed 10. A wheel slide 13 is slidably mounted on slide guides 12 formed on the support base 11. A wheel spindle 15 having a grinding wheel 14 is rotatably mounted on the wheel slide 13 and is provided with a multiple V-grooved pulley 19 which is connected by multiple V-belts 18 with a multiple V-grooved pulley 17 mounted on an electric motor 16 which is fixedly mounted on the wheel slide 13. Thus, the grinding wheel 14 is rotated by the motor 16 for performing the grinding operation on a workpiece W. A hydrualic actuator 20 is fixedly provided on the support base 11 and contains a slidable piston 21 therein. The piston 21 is provided with a coaxial bore 21a through which a feed screw shaft 22 is rotatably journaled, being restrained from axial movement. A threaded portion 22a of the feed screw shaft 22 is threadably engaged with a nut 23 which is fixed to the underside of the wheel slide 13. A gear 24 and a pair of dogs 25 and 26 are mounted on the portion opposite the threaded portion 22a. Limit switches LS1 and LS2 are mounted on the support base 11 and are actuated by the dogs 25 and 26 for respectively confirming the finish of the forward quick feed and rearward quick retraction of the wheel slide, as will be explained in greater detail hereinafter.

Rotatably mounted on the rear portion of the support base 11 are support shafts 27 and 28 on which gears 29 and 30 and gears 31 and 32 are respectively mounted to connect the gear 24 with a gear 34 on a pulse motor 33 so that the rotation of the pulse motor 33 is transmitted to the feed screw shaft 22 with a reduced ratio.

It is to be noted that the gear 29 is long enough so as to maintain engagement with the gear 24 even if the gear 24 is moved in an axial direction by the hydraulic actuator 20.

Formed perpendicular to the slide guidies 12 on the bed 10 are guides 35 on which a traverse table 36 is slidably mounted and reciprocated by an actuator 39 secured to the bed 10. A swivel table 38 on which a headstock 37 and a foolstock (not shown) are provided is mounted on traverse table 36.

A wheel dressing device (described in more detail hereinafter) for dressing the grinding wheel 14 is mounted on the wheel slide. Every time the grinding wheel 14 is dressed, the pulse motor 33 is supplied with additional drive pulses at the start of the operation so that the original or starting position of the wheel slide 13 is shifted by an amount equal to the dressed amount. The diameter of the workpiece W is measured by a caliper 81.

Figure 2:
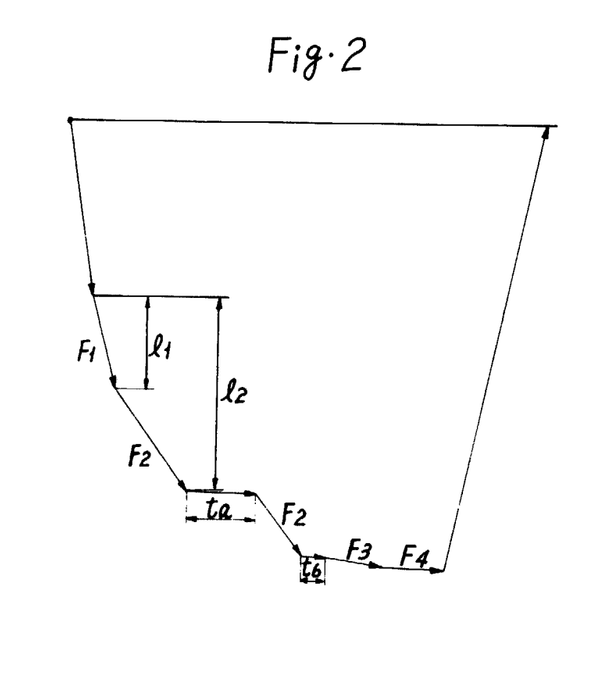
FIG. 2 is a diagram helpful in illustrating a grinding cycle of a grinding machine controlled by the feed control apparatus according to the present invention.

As shown in FIG. 2, the wheel slide 13 is moved at a rapid speed by the hydraulic actuator 20 and thereafter, at various grinding feed speeds by the pulse motor 33 through the feed screw shaft 22 and its associated mechanism. When the wheel slide 13 has been moved to a predetermined position, that is, when the caliper 81 generates a sizing signal, the wheel slide 13 is retracted to the compensated original position at a rapid retraction speed by the cooperation of the pulse motor 3 and the hydraulic actuator 20. Since the distance through which the wheel slide 13 is moved is counted by an up-down counter, the wheel slide 13 may be automatically retracted to its original starting position by retracting the wheel slide until the content of the up-down counter is reduced to zero, the original starting position being, of course, changed every time the dressing operation is performed.

Figure 3:
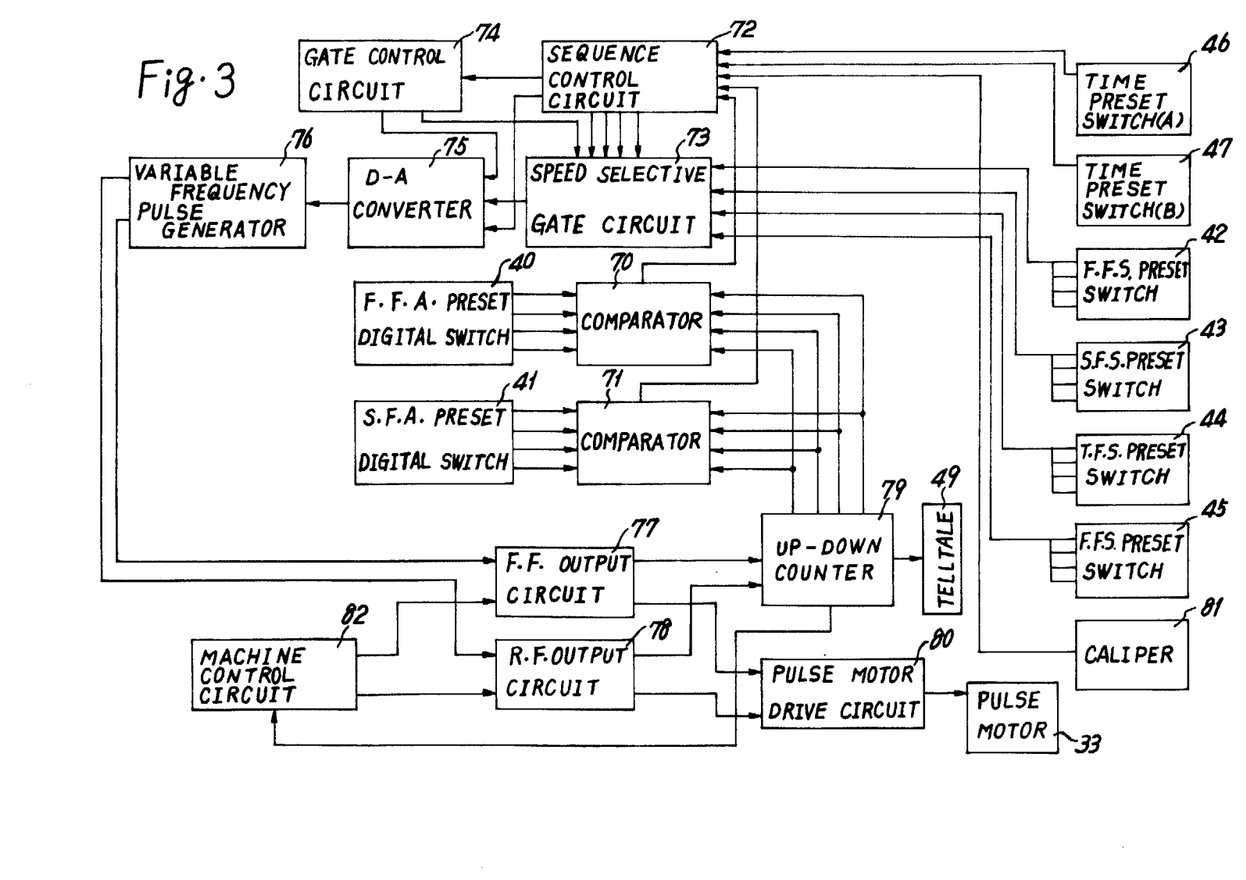
FIG. 3 is a block diagram of a preferred embodiment of the feed control apparatus according to the present invention.
Figure 4:
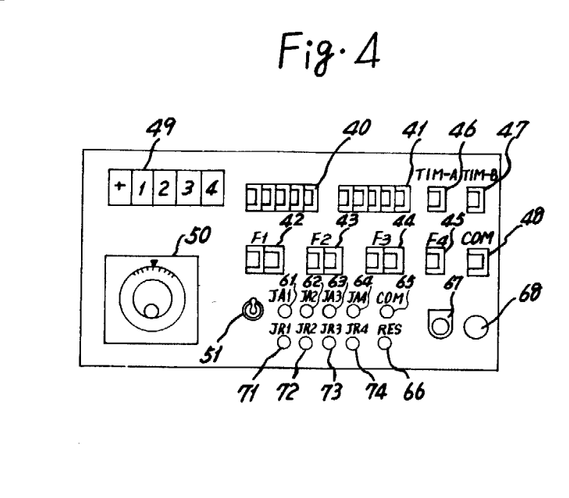
FIG. 4 is a diagram of one example of a control panel utilized with the present invention.

Referring now to FIGS. 3 and 4, a preferred embodiment of the feed control apparatus of the present invention is seen to comprise comparators 70 and 71 which are respectively connected to a first feed amount preset digital switch 40 and a second feed amount preset digital switch 41. Comparators 70 and 71 compare the contents of the digital switches with that of an up-down counter 79 and supply match signals to a sequence control circuit 72 when such contents coincide. When supplied with match signals, the sequence control circuit 72 operates a speed selective gate circuit 73 to select an appropriate speed. A gate control circuit 74 is provided to close the speed selective gate circuit 73 and to supply a predetermined value to a D-A converter 75 in response to the sequence control circuit 72 so that the D-A converter 75 generates a predetermined low electric voltage. The D-A converter 75 converts the digital value supplied from the speed selective gate circuit 73 to a d.c. voltage signal and supplies the same to a variable frequency pulse generator 76. The output pulse signals of the variable frequency pulse generator 76 are supplied to a forward feed output gate (F.F. output gate) 77 and a reverse feed output gate (R.F. output gate) 78 which, in turn, respectively supply the pulse signals to the adding and subtracting terminals of the up-down counter 79 and the forward and reverse terminals of a pulse motor drive circuit 80. The caliper 81 measures the diameter of the workpiece and supplies signals when the workpiece is ground to predetermined diameters. A conventional machine control circuit 82 controls the operation of the machine.

Figure 5:
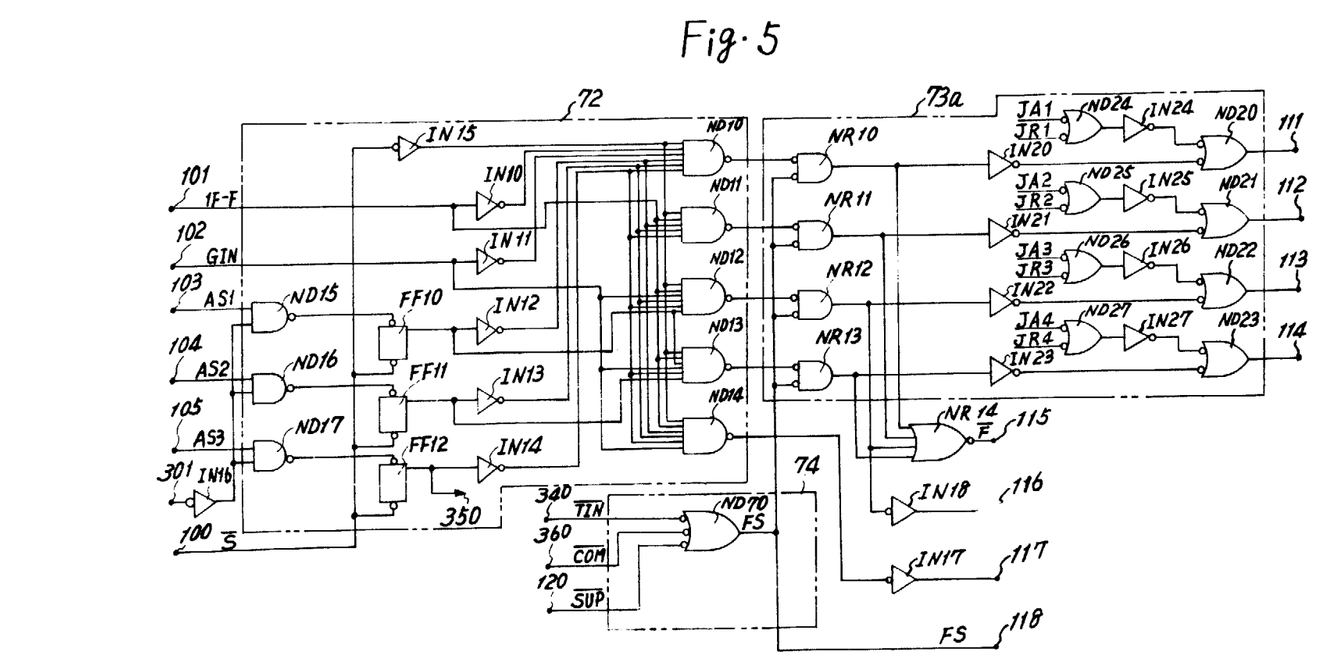
FIGS. 5 through 8 show logic circuit diagrams of a preferred embodiment accordng to the present invention.

Referring now to FIG. 5, a preferred embodiment of the sequence control circuit 72 of FIG. 3 is shown in more detail comprising NAND-gates ND10 to ND17, flip-flops FF10 to FF12 and inverters IN10 to IN16. When a start button 67 on the control panel (seen in FIG. 4) is pressed, the wheel slide 13 is moved toward the workpiece W at a rapid speed by means of the hydrualic actuator 20 which is controlled by the conventional control circuit 82. When the limit switch LS1 is actuated by the dog 25, a start signal $\bar{s}$ appears on a lead 100 and thus, the NAND-gate ND10 generates by the aid of the inverter IN15 a low lever signal (such a low level signal will be referred to hereinafter as a "0" signal) to command a feed at a first feed speed. The first feed speed is utilized when the pulse motor 33 causes wheel slide 13 to approach the workpiece after the feed by the hydraulic actuator 20 is terminated. Simultaneously, the flip-flops FF10 to FF12 are reset by the start signal $\bar{s}$.

A signal 1FF which indicates the termination of a feed at the first feed speed is supplied to a lead 101 so that the NAND-gates ND10 and ND11 respectively generate a high level signal (such as a high level signal will be hereinafter referred to as a "1" signal) and a 0 signal to command a second feed speed. The second speed feed is utilized for a rough grinding operation. A signal GIN which is generated during the second speed feed is supplied through a lead 102 to the NAND-gate ND14 which, therefore, generates a 0 signal. Sizing signals AS1, AS2 and AS3 which are generated by the caliper 81 are respectively sequentially supplied through leads 103, 104 and 105 to the NAND-gates ND15, ND16 and ND17 to thereby set the flip-flops FF10, FF11 and FF12. When the flip-flops FF10 and FF11 are set, the NAND-gates ND12 and ND13 generate a 0 signal to thereby command third and fourth speed feeds which are respectively utilized for a fine grinding operation and a final grinding operation. When the flip-flop FF12 is set by the final sizing signal AS3, all of the NAND-gates ND10 to ND14 generate a 1 signal.

Figure 6:
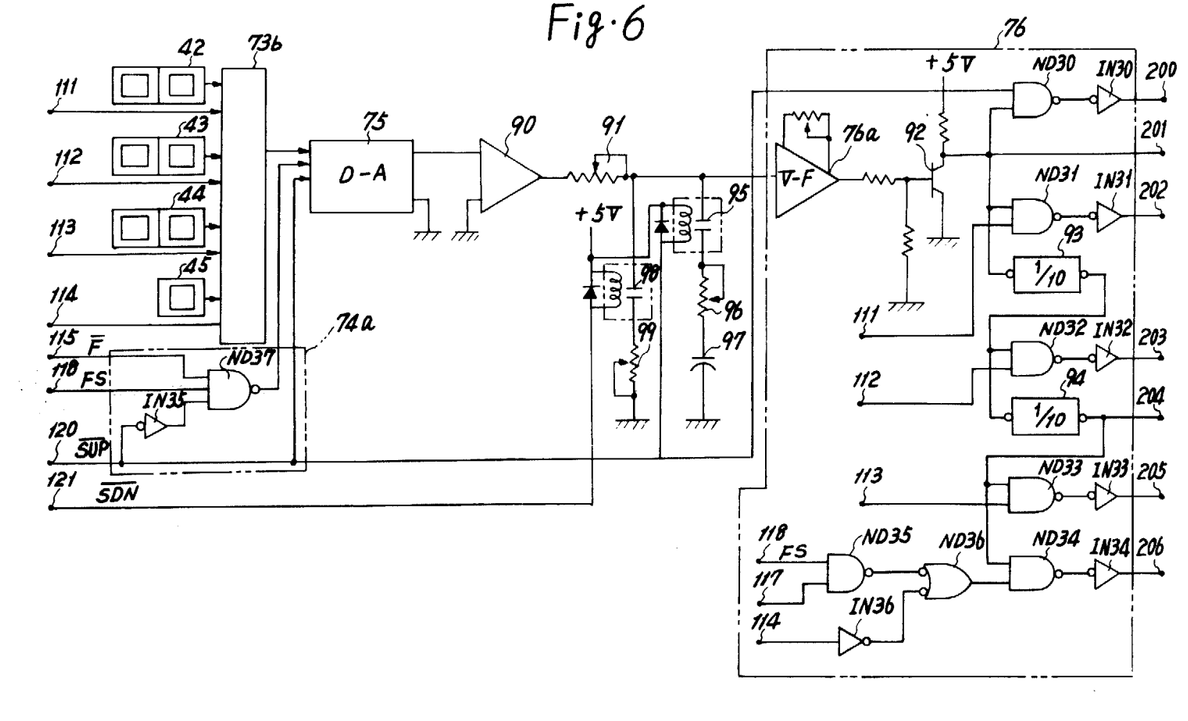

The speed selective gate circuit 73 shown in FIG. 3 corresponds to the circuits 73a and 73b as shown in FIGS. 5 and 6 respectively. Circuit 73a is seen to include NOR-gates NR10 to NR13, which are respectively supplied with the outputs of the NAND-gates ND10 and ND13 and the gate control circuit 74. The output FS of the gate control circuit 74 also appears on a lead 118. The outputs of the NOR-gates NR10 to NR13 are supplied through inverters IN20 to IN23 to NAND-gates ND20 to ND23, the outputs of which are, in turn, supplied to the speed selective gate circuit 73b (shown in FIG. 6) through leads 111 to 114 so that one of the speed preset digital switches 42, 43, 44 and 45 will be selected.

The Nand-gates ND20 to ND23 are respectively connected at the input terminals thereof through inverters IN24 to IN27 with NAND-gates ND24 to ND27 which are, in turn, connected to speed selective push buttons 61 to 64 and 71 to 74 on the control panel (shown in FIG. 4). The inverters 18 and 17 which are respectively connected to the NOR-gate NR12 and the NAND-gate ND14 are connected over leads 116 and 117 to a digital timer circuit (FIG. 8) so as to generate signals indicative of the energization of the digital timer circuit.

NOR-gate NR14 generates a 1 signal to stop the feed motion of the wheel slide 13 when no command of speed signals is applied thereto from the NOR-gates NR10 to NR13 or when a NAND-gate ND70 of the gate control circuit 74 generates a 1 signal.

The speed selective gate circuit 73b of FIG. 6 is connected to a D-A converter 75 which is, in turn, connected to the variable frequency pulse generator 76 through an amplifier 90 and a toroidal transformer 91. The output pulse signals generated by a V-F converter 76a in the pulse generator 76 are supplied to the base of a transistor 92 in order to correct the shape of the pulse signals. The transistor 92, in turn, furnishes the shape-corrected pulse signals to NAND-gates ND30 to ND34 and division circuits 93 and 94. The outputs of the NAND-gates ND30 to ND34, the transistor 92 and division circuit 94 respectively appears on leads 200, 202, 203, 205, 206, 201 and 204.

The high frequency pulse signals will appear on the lead 200 only when the wheel slide is to be retracted at the rapid retraction speed. However, the frequency of the pulse signals gradually increases at the start of the retraction of the wheel slide and gradually decreases towards the stop thereof by the aid of a slow-up and slow-down circuit, which will be described in more detail hereinafter. The wheel slide position compensating pulse signals and first, second, third and fourth speed feed pulse signals respectively appear on the leads 201, 202, 203, 205 and 206 which are connected to the F.F. output gate 77 seen in detail in FIG. 7 to be described later.

After the digital timer (FIG. 8) is energized, the frequency of the pulse signals of the V-F converter 76a can be as high as 100Hz. The pulse signals are divided by the division circuits 93 and 94 into pulse signals of 1 Hz which appears on the lead 204.

Still referring to FIG. 6, one input terminal of the NAND-gate ND34 is connected to the leads 118, 117 and 114 through NAND-gates ND35 and ND36 and inverter IN36 so that the creeping speed feed may be performed during the course of the second speed feed or rough grinding feed. The input terminal of the V-F converter 76a is connected to ground through relay contact 95, toroidal transformer 96 and condenser 97. A serial connection of relay contact 98 and toroidal transformer 99 is also connected to the input terminal of the V-F converter 76a in parallel with the serial connection of the relay contact 95, the toroidal transformer 96 and the condenser 97. The relay contact 95 is closed by a slow-up signal $\overline{SUP}$ through the lead 120 so that the condenser 97 is charged in order to gradually increase the electric voltage applied to the V-F converter 76a. Similarly, the relay contact 98 is closed by a slow-down signal $\overline{SDN}$ through a lead 121 so that the condenser 97 is discharged and thus, the electric voltage applied to the V-F converter 76a will be gradually lowered. The NAND-gate ND37 in the gate control circuit 74a is connected to the leads 115, 118 and 120 at the input terminals thereof. When supplied with a signal from the NAND-gate ND37, the D-A converter 75 generates an electric voltage by which the V-F converter 76a generates pulse signals of 100 Hz. The slow-up signal $\overline{SUP}$ is also directly applied to the input terminal of the D-A converter 75 so that the same will generate an electric voltage by which the V-F converter 76a will generate pulse signals of 8 KHz.

Figure 7:
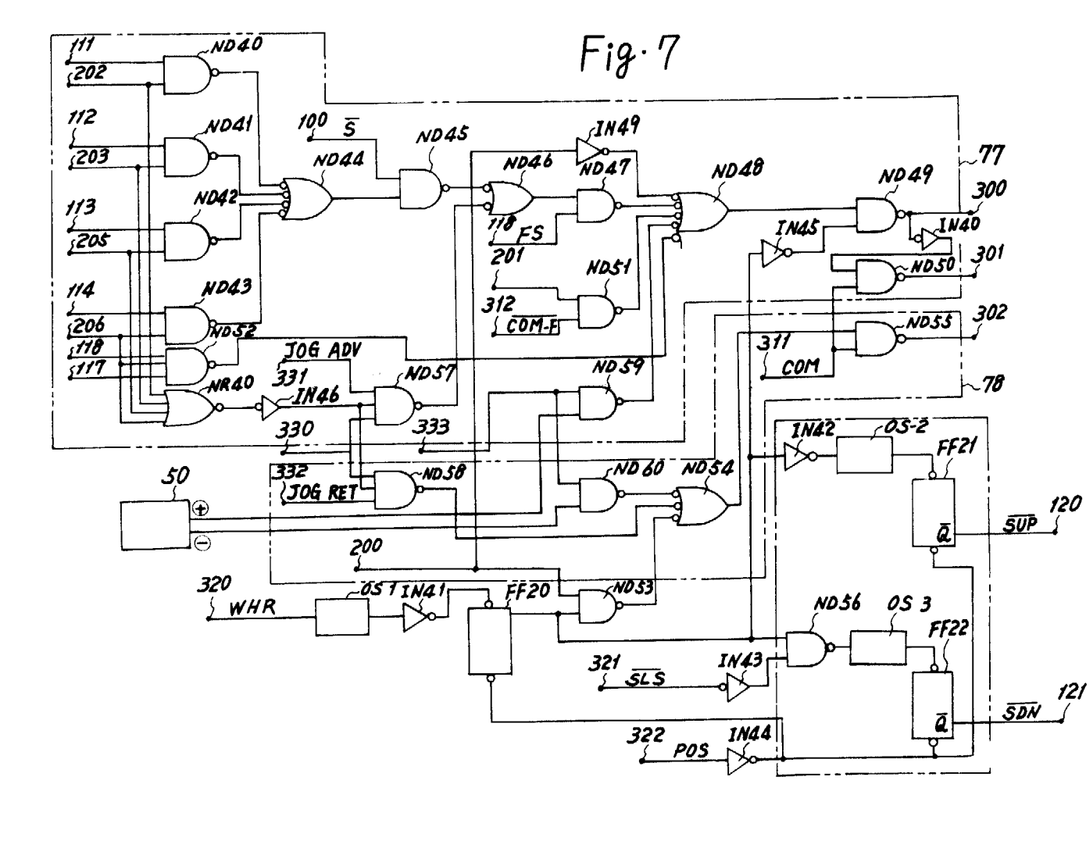

The FF output gates 77 and RF output gate 78 shown in FIG. 7 distribute the pulse signals from the pulse generator 76 to leads 300, 301 and 302 through which wheel slide compensation pulse signals, forward feed pulse signals and reverse feed pulse signals are respectively supplied to the pulse motor 33 through the pulse motor drive circuit 80. NAND-gates ND40 through ND43 respectively receive input signals from the lead pairs (111, 202), (112, 203), (113, 205) and (114, 206) and are connected through the serial connection of NAND-gates ND44 to ND49 to the lead 300 which is, in turn, connected to the forward rotation input terminal of the pulse motor drive circuit 80 and a wheel slide position compensation circuit. The lead 300 is also connected through NAND-gate ND50 and inverter IN40 to a lead 301 which is, in turn, connected to the adding terminal of the up-down counter 79. When wheel slide position compensation is required, a compensation signal $\overline{COM}$ or a 0 signal is supplied to the NAND-gate ND50 over a lead 311 to close same. Accordingly, pulse signals for compensating the wheel slide position are supplied to the pulse motor drive circuit 80, but not the up-down counter 79 and the original position of the wheel slide will, therefore, be compensated in accordance with the dressing amount. At this point, pulse signals of a frequency of 100Hz for compensating the wheel slide position are supplied to a lead 201 which thus appear on the lead 300 through NAND-gates ND51, ND48 and ND49. When a predetermined number of the compensation pulse signals has been furnished, a compensation finish signal $\overline{COM-F}$ or a 0 signal is supplied to a lead 312 to thereby close the same so that the wheel slide compensation is terminated. NAND-gate ND52 is connected to leads 117, 118 and 206 at the input terminals thereof, and at the output terminals thereof, through NAND-gates ND48 and ND49, to the lead 300 and through the additional circuits of the inverter IN40 and the NAND-gate 50 to the lead 301 so that pulse signals of a frequency of the creeping feed speed are supplied.

When applied with the wheel slide retraction signal WHR through one shot circuit OS-1 and inverter IN41 from a lead 320, a flip-flop FF20 is set to thereby supply a 1 signal to a NAND-gate ND53 so that the same will open and thus, the high frequency pulse signls supplied over the lead 200 may be passed to the lead 302 over NAND-gates ND54 and ND55 for retracting the wheel alide at a rapid retraction speed. The output at the set side of the flip-flop 20 is supplied through an inverter 42 to a one shot circuit OS-2 which, in turn, applied the output signal thereof to a flip-flop 21 to thereby set the same. Accordingly, the output at the reset side of the flip-flop 21 is supplied as the slow-up signal $\overline{SUP}$ to the lead 120 (FIG. 6) so that the relay contact 95 is closed to charge the condenser 97 to thereby gradually increase the frequency of the wheel slide retraction pulse signals up to 8KHz. The high frequency pulse signals on the lead 302 are supplied to the reverse rotation terminal of the pulse motor drive circuit 80 to rotate the pulse motor 33 in a reverse rotational direction and to the subtracting terminal of the up-down counter 79 to count the amount of retraction.

When the up-down counter 79 detects that the wheel slide has approached its original position, a speed reducing signal SLS is supplied over inverter IN43, NAND-gate ND56, and one-shot circuit OS-3 from a lead 321 to set a flip-flop FF22. When set, the flip-flop FF22 supplies the slow-down signals $\overline{SDN}$ from the reset output terminal $\overline{Q}$ thereof over the lead 121 so that the relay contact 98 (FIG. 6) is closed and the condenser 97 is, therefore, discharged to thereby decrease the frequency of the pulse signals generated by the V-F converter 76a. Subsequently, when the contents of the up-down counter 79 is reduced to "zero", a signal POS is supplied over a lead 322 (FIG. 7) through an inverter IN44 to reset the flip-flops FF 20, 21 and 22. Consequently, the pulse signals are interrupted through the lead 302 for retracting the wheel slide to thereby stop the wheel slide at its original starting position.

When the wheel slide retraction signal WHR is generated, the hydrualic actuator 20 is also simultaneously actuated so that the wheel slide is retracted by both the pulse motor 33 and hydraulic actuator 20.

When the manual feed-pitch feed changeover switch 51 on the control panel (seen in FIG. 4) is switched for manual operation, and in addition, one of the forward feed push buttons 61, 62, 63 or 64 is pushed, NAND-gate ND57 will be selected, since a 1 signal appears on lead 330 and lead 331 respectively with the aid of switch 51 and the forward feed push buttons. Consequently, one series of pulse signals supplied to the leads 202, 203, 205 and 206 will be supplied to the lead 300 through NOR-gate NR40, inverter IN46, NAND-gates ND57, ND46, ND47, ND48 and ND49 and thence, to the lead 301 via inverter IN40 and the NAND-gate ND50.

When one of the reverse feed buttons 71, 72, 73 or 74 is pushed, a 1 signal is applied to a lead 332 and thus, NAND-gate ND58 is selected so that one series of pulse signals on the leads 202, 203, 205 and 206 will be applied to the lead 302 through NAND-gates ND58, ND54 and ND55.

When the switch 51 is switched to "pitch feed" by an operator, a 1 signal is applied to NAND-gates ND59 and ND60 over a lead 333 (FIG. 7). Accordingly, the pulse signals generated by the manual pulse generator 50 will be supplied to either the leads 300, 301 or to the lead 302. In other words, when pulse signals are generated at the ⊕ output terminal of the pulse generator 50 in order to rotate the pulse motor in a forward rotational direction, the pulse signals will be supplied to leads 300 and 301 over NAND-gates ND59, ND48, ND49 and ND50 and inverter IN40. Conversely when pulse signals are generated at the ⊖ output terminal of generator 50 in order to rotate the pulse motor in a reverse rotational direction, the pulse signals will be supplied to lead 302 over NAND-gates ND60, ND54 and ND55.

Figure 8:
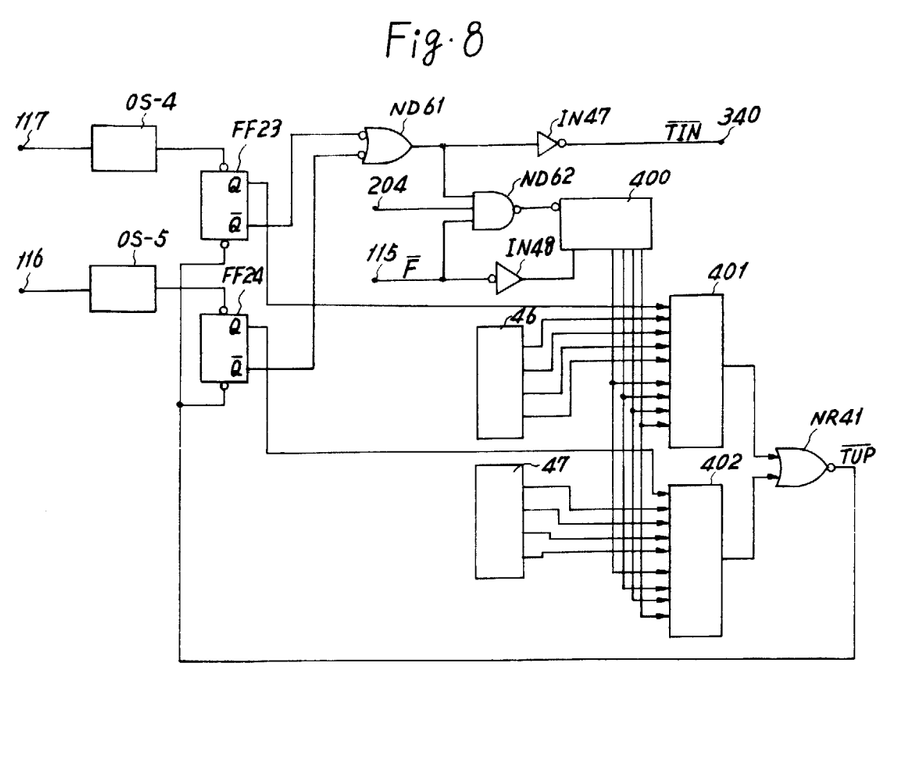

FIG. 8 shows a digital timer circuit wherein one shot circuits OS-4 and OS-5 are respectively connected to flip-flops FF23 and FF24 at the output terminals thereof and to the leads 117 and 116 also shown in FIG. 5 at the input terminals thereof so as to set the flip-flops by time-in signals. It should be noted that a time-in signal is indicative of the beginning of the energization of the timer circuit, while a time-up signal is indicative of the signal which is generated by the timer circuit when a predeteremined interval of time has elapsed. A NAND-gate ND61 which is connected to the reset terminals $\overline{Q}$ of flip-flops FF23 and FF24 is connected to a lead 340 through an inverter IN47 so that when supplied with a time-in signal, $\overline{TIN}$ the gate circuit 74 (as shown in FIG. 5) operates to close the speed selective gate circuit 73a and also to supply a signal FS to the lead 118. The pulse signals over the lead 204 (as shown in FIG. 6) are supplied through NAND-gate ND62 to counter 400 only when the time-in signal TIN is applied to the NAND-gate ND62 and the number of the pulse signals applied thereto compares with the preset number in the digital switches 46 and 47 by means of comparators 401 and 402. Match signals from the comparators 401 and 402 are supplied to a NOR-gate NR41 which, in turn, applies the time-up signal $\overline{TUP}$ to reset the flip-flops FF23 and FF24. Consequently, the time-in signal $\overline{TIN}$ becomes "1" and the gate control circuit 74 supplies a "0" signal to the lead 118, the speed selective gate circuit 73a being again opened thereby. An inverter IN48 operates to reset counter 400 in response to the signal F from the NOR-gate 14 over the lead 115.

OPERATION

Assume that the digital switches on the control panel shown in FIG. 4 are preset so as to perform the grinding cycle illustrated in FIG. 2. The distances L1 and L2 are respectively preset by the feed amount preset switches 40 and 41. The first to fourth feed speeds F1, F2, F3 and F4 are also preset by the digital switches 42 to 45.

In this condition, the start button 67 is pressed to initiate the grinding cycle and the wheel slide 13 is advanced at a rapid advance speed by the hydraulic actuator 20. Subsequently, the limit switch LS1 is actuated to signify the cessation of advancement of the wheel slide 13 by the hydraulic actuator 20 and to supply the start signal $\overline{S}$ to the lead 100 (FIG. 5) so as to initiate the forward feed by means of the pulse motor 33.

Accordingly, the NAND-gate ND10 is selected and thus, a 1 signal is produced at the lead 111 of the speed selective gate circuit 73a. Therefore, the first feed speed preset digital switch 42 (FIG. 6) is selected by the gate circuit 73b so that the D-A converter generates an electric voltage corresponding to the preset value on the digital switch 42 and the V-F converter 76a supplies a series of pulse signals to the lead 202 in response to the electric voltage. The pulse signals from the V-F converter 76a are applied over NAND-gates ND40, ND44, ND45, ND46, ND48 and ND49 to lead 300 and thence, to the forward rotation terminal of the pulse motor drive circuit 80 in order to advance the wheel slide 13 at the first feed speed. The pulse signals are also applied from the lead 300 to the lead 301 so that the number of pulse signals applied to the pulse motor 33 through the pulse motor drive circuit 80 will be counted by the up-down counter 79. When the contents of the up-down counter 79 becomes equal to the amount L1 preset on the first feed amount preset digital switch 40, the comparator 70 furnishes a match signal 1F-F to the lead 101 (FIG. 5). Accordingly, the NAND-gate ND11 is selected and a 1 signal appears on the lead 112 of the speed gate circuit 73a and the second feed speed digital switch 43 is selected by the gate circuit 73b. The present value on the digital switch 43 is converted into an electric voltage by the D-A converter 75 and the V-F converter 76a generates a series of pulse signals corresponding in number to the electric voltage.

The pulse signals generated by the V-F converter are divided by one-tenth by the division circuit 93 and thereafter are sent from the lead 203 to the NAND-gate ND41. Therefore, pulse signals are supplied to the up-down counter 79 and the pulse motor drive circuit 80 to advance the wheel slide 13 at the second feed speed, i.e., to perform the rough grinding operation on the workpiece. When the contents of the counter 79 becomes equal to the preset amount L2, the comparator 71 generates a match signal GIN which is supplied to the lead 102 (Shown in FIG. 5).

Accordingly, the NAND-gate ND14 is selected, the flip-flop FF23 (FIG. 8) is set by the signal supplied through the lead 117 and the one-shot circuit OS–4. Consequently, the time-in signal TIN appears on the lead 340 which signal is applied to the NAND-gate 70 of the gate control circuit 74 so as to close the NOR-gates NR10 to NR13 of the feed speed selective circuit 73a and the lead 118. The signal FS or 1 signal on the lead 118 is supplied to the NAND-gate ND37 (FIG. 6) and thence, to the D-A converter 75. As mentioned above, when supplied with the signal from the gate control circuit 74a, the D-A converter 75 supplies a low electric voltage so that the output frequency of the V-F converter 76a will be reduced to 100 Hz.

The output pulses of the V-F converter 76a are divided by 100 by means of the division circuits 93 and 94 and thus, pulse signals of a frequency of 1Hz appear on the lead 204. The divided pulse signals are applied over the NAND-gate ND62 (FIG. 8) to the counter 400 which counts the number of the pulse signals applied thereto. Meanwhile, the comparator 401 compares the contents of the counter 400 and the contents of the digital switch 46. By the time-in signal TIN over the lead 340, the NAND-gate ND35 of the variable frequency pulse generator 76 (FIG. 6) is supplied with a 1 signal at the input terminals 117 and 118 thereof. Therefore, pulse signals of a frequency of 1Hz are passed through the NAND-gate ND34 and the inverter IN34 by means of the signal from the NAND-gate ND36 and thereafter are applied to the NAND-gate ND52. Since the NAND-gate ND52 is supplied with a 1 signal from the leads 117 and 118, the pulse signals from the lead 206 will pass to the leads 300 and 301 and thus, the feeding speed of the wheel slide 13 will be switched to the creeping feed speed, which is lower than the second feed speed, after the timer circuit has been energized. Accordingly, for the preset interval of time $t_a$ as seen in FIG. 2, the wheel slide 13 will be advanced at the creeping feed speed. When the preset interval of time $t_a$ lapses, the comparator 401 supplies a match signal to the NOR-gate NR41 which, in turn, furnishes the time-up signal TUP to reset the flip-flop FF23 with the result that the time-in signal TIN becomes 1 on the lead 340.

Consequently, the gate control circuit 74 (shown in FIG. 5) opens the speed selective gate circuit 73a so that the wheel slide 13 is, again, advanced at the second feed speed.

It should be noted that the match signal of the comparator 71 directs the advancement of the caliper 81 towards the workpiece and furthermore, if necessary, directs the advancement of the workpiece rest device.

When the rough grinding operation has processed to reduce the diameter of the workpiece, the caliper 81 supplies the first caliper signal AS1 to the lead 103 so that that the second feed speed changes to the third feed speed, i.e., the rough grinding operation changes into the a fine grinding operation. However, it is to be noted that the second feed speed does not change into the third feed speed instantaneously, even if the first caliper signal AS1 is supplied to the lead 103. THe flip-flop FF10 is set by the first caliper signal AS1, and the signal from the set side thereof is supplied over NAND-gate ND12, NOR-gate NR12, inverter IN18, lead 116 and one-shot circuit OS–5 to set the flip-flop FF24 (FIG. 8).

Accordingly, the timer circuit (FIG. 8) is set and thus, the time-in signal $\overline{TIN}$ will be supplied over the lead 340 to the NAND-gate ND70 of the gate control circuit 74 which operates to close the speed selective gate circuit 73a resulting in stopping the advancement of the wheel slide 13.

When the preset interval of time $t_b$, that is, the interval preset on the digital switch 47, has elapsed, a fine grinding operation by the third feed speed begins. In other words, when the comparator 402 generates a match signal, the NOR-gate NR41 supplies the time-up signal $\overline{TUP}$ in response thereto to reset the flip-flop FF24 so that the time-in signal TIN becomes 1 and the NOR-gate NR12 (FIG. 5) is opened by means of the gate control circuit 74.

When the fine grinding operation has been completed by the third feed speed, the caliper 81 furnishes a second caliper signal AS2 over the lead 104 (FIG. 5) in order to change the third feed speed into the fourth feed speed. The fourth feed speed F4 is preset on the fourth speed register 45 and is, as mentioned above, quite low, for example, 0.03 mm/min. When the workpiece is reduced to the required size by the grinding operation at the fourth feed speed, the caliper 81 supplies a third caliper signal AS3 over the lead 105 to the NAND-gate ND17. By this signal, the flip-flop FF12 is set so as to close all the NAND-gates ND10 to ND14 and the wheel slide retraction signal WHR will be applied over the lead 320 (FIG. 7). The hydrualic actuator 20 is also actuated by a conventional control circuit in response to the third caliper signal AS3. Simultaneously, the flip-flop FF20 is set by the third caliper signal AS3 supplied through the one-shot circuit OS–1 and the inverter IN41 and the flip-flop FF21 is also set by the signal from the flip-flop FF20 so that the slow-up signal $\overline{SUP}$ will be supplied over the lead 120 (FIG. 6). Therefore, the D-A converter 75 will furnish a high electric voltage to the V-F converter 76a. The relay contact 95 is closed by the slow-up signal $\overline{SUP}$ to thereby charge the condenser 97 so that the frequency of the pulse signals from the V.-F converter 76a will gradually increase up to 8 KHz. which pulse signals are applied over the NAND-gate ND30, the inverter IN30 and the lead 200. The pulse signals over the lead 200 are supplied through the NAND-gates NS53, ND54 and ND55 to the lead 302 and then, to the rearward rotation terminal of the pulse motor drive circuit 80 and the subtracting terminal of the up-down counter 79 so as to retract the wheel slide 13 at a rapid retraction speed. When the contents of the up-down counter 79 is reduced to a predetermined amount which is close to zero, the up-down counter 79 will supply the slow signals SLS over the lead 321 (FIG. 7). Accordingly, the flip-flop 22 will be set and will send the slow down signal SDN from the reset side thereof to the lead 121 (FIG. 6) resulting in the relay contact 98 being closed and the condenser 97 discharging to thereby decrease the electric voltage supplied to the V-F converter 76a which, in turn, decreases the frequency of the pulse signals. Subsequently, when the contents of the reversible counter 79 is reduced to zero, the up-down counter 79 supplies the signal POS or 1 over the lead 322 so as to reset the flip-flops FF20, 21 and 22. Therefore, no signals will be supplied to the leads 120 and 121 (FIG. 6) and the V-F converter 76a ceases the generation of pulse signals and naturally, the wheel slide will stop at the original starting position thereof, thereby completing the grinding cycle as shown in FIG. 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Feed control apparatus for a grinding machine having tool and workpiece supports which respectively support a tool and a workpiece, comprising:
    variable frequency pulse generating means for generating a series of pulse signals;
    caliper means for measuring said workpiece and for generating a plurality of caliper signals when said workpiece is ground to predetermined sizes;
    a stepping motor for causing relative motion between said supports in response to said pulse signals;
    counter means for counting the number of said pulse signals supplied to said stepping motor to detect a distance between said supports;
    first presetting means for digitally presetting feeding amounts through which said supports are relatively moved from each other before the caliper signal is generated by said caliper means;
    second presetting means for digitially presetting first and second series of feeding speeds of said stepping motor, said first and second series of the feeding speeds being respectively utilized before and after said caliper signal is generated by said caliper means;
    comparing means for comparing the contents of said counter means and said first presetting means and for generating match signals when said contents coincide; and
    control means for selecting one of said second presetting means to supply a digital value preset in said selected presetting means to said variable frequency pulse generator in response to said match signals and said caliper signals in order to perform the relative motion between said supports at the feeding speed directed by said digital value.

2. Feed control apparatus according to claim 1, which further comprises:
    timer means for generating a first signal in response to one of said match signals and a second signal after a predetermined interval of time; and
    gate control means for closing said control means and for supplying a third signal to said variable frequency pulse generator in order to perform a creeping feed operation between said tool and said workpiece for a time interval defined by said first and second signals.

3. Feed control apparatus according to claim 2, which further comprises a slow-up means operably connected to said variable frequency pulse generator for gradually increasing an electric voltage supplied thereto when one of said supports is retracted from the other.

4. Feed control apparatus according to claim 3, which further comprises a slow-down means operably connected to said variable frequency pulse generator for gradually decreasing an electric voltage supplied thereto in response to a signal from said counter means.

5. Feed control apparatus according to claim 3, wherein said slow-up means comprises a first relay means responsive to one of said caliper signals and an electric condenser provided between said first relay means and ground.

6. Feed control apparatus according to claim 5, wherein said slow-down means comprises a relay means connected to said first relay means and the earth in parallel with said first relay means.

7. Feed control apparatus for a grinding machine having tool and workpiece supports respectively supporting tool and a workpiece, comprising:
    variable frequency pulse generating means for generating a series of pulse signals;
    caliper means for measuring said workpiece and for generating a plurality of caliper signals when said workpiece is ground to predetermined sizes;
    a stepping motor for causing relative motion between said supports in response to said pulse signals;
    counter means for counting the number of said pulse signals supplied to said stepping motor to detect a distance between said supports;
    first presetting means for digitally presetting a feeding amount through which said supports are relatively moved from each other before the caliper signal is generated by said caliper means;
    second presetting means for digitially presetting first and second series of feeding speeds of said stepping motor, said first and second series of the feeding speeds being respectively utilized before and after said caliper is generated by said caliper means;
    comparing means for comparing contents of said counter means and said first presetting means and for generating a match signal when said contents coincide;

control means for selecting one of said second presetting means to supply a digital value preset in said selected one of said second presetting means to said variable frequency pulse generator in response to said match signal;

timer means for generating a first signal in response to said match signal and a second signal after a predetermined interval of time; and gate control means for closing said control means and supplying a third signal to said variable frequency pulse generator for a time interval defined by said first and second signals, said variable frequency pulse generator supplying pulse signals of a frequency by which said stepping motor performs a creeping feed operation between said tool and said workpiece.

8. Feed control apparatus according to claim 7, wherein said comparing means generates said match signal during a rough grinding operation.

9. Feed control apparatus according to claim 7, wherein said gate control means is operable to open said control means in response to said second signal, and said control means supplies said digital value to said variable frequency pulse generator to start a rough grinding operation.

10. Feed control apparatus according to claim 7, wherein said variable frequency pulse generator comprises:
- a first converting means operably connected to said second presetting means for converting a digital value into an analog value,
- a second converting means operably connected to said first converting means for generating a series of pulse signals of a frequency corresponding to said analog value;
- dividing means for dividing said pulse signals in order to reduce the frequency thereof, and
- gate means operably connected to said control means and said dividing means for passing the pulse signals of said reduced frequency to said stepping motor 11. Feed control apparatus for a grinding machine having tool and workpiece supports respectively supporting a tool and a workpiece, comprising:

variable frequency pulse generating mans for generating a series of pulse signals;

caliper means for measuring said workpiece and for generating first and second caliper signals when said workpiece is ground to predetermined sizes;

a stepping motor for causing relative motion between said supports in response to said pulse signals;

counter means for counting the number of said pulse signals applied to said stepping motor to detect a distance between said supports;

first presetting means for digitally presetting first and second feeding amounts through which said supports are relatively moved from each other before the caliper signal is generated by said caliper means;

second presetting means for digitally presetting first, second, third and fourth feeding speeds of said stepping motor;

comparing means for comparing contents of said counter means and said first presetting means and for generating first and second match signals when said contents coincide; and control means for selecting said first, second, third and fourth feeding speeds in response to said first match signal, second match signal, first caliper signal and second caliper signal, respectively, in order to supply digital values corresponding thereto to said variable frequency pulse generator.

12. Feed control apparatus according to claim 11, which further comprises:

timer means for generating a first time signal in response to said second match signal and a second time signal after a predetermined interval of time; and gate control means for closing said control means and supplying a gate signal to said variable frequency pulse generator for a time interval defined by said first and second time signals, said variable frequency pulse generator supplying pulse signals in order to perform a creeping feed operation between said tool and said workpiece.

13. Feed control apparatus according to claim 11, wherein said second and third feeding speeds are respectively utilized for rough and fine grinding operations and said fourth feeding speed is slower than said third feeding speed and utilized for obtaining a required size on said workpiece.

* * * * *